United States Patent
Eisele

(10) Patent No.: US 6,378,202 B1
(45) Date of Patent: Apr. 30, 2002

(54) THERMAL SHIELD AND HERMETIC SEAL FOR PREVENTING DETERIORATION OF PLASTIC INSULATION IN OPEN ACCESS CLOSURES AND METHOD THEREFOR

(75) Inventor: William E. Eisele, San Antonio, TX (US)

(73) Assignee: SBC Communications, San Antonio, TX (US)

( * ) Notice: Subject to any disclaimer, the term of this patent is extended or adjusted under 35 U.S.C. 154(b) by 0 days.

(21) Appl. No.: 09/604,926

(22) Filed: Jun. 28, 2000

Related U.S. Application Data
(60) Provisional application No. 60/141,015, filed on Jun. 29, 1999.

(51) Int. Cl.$^7$ .......................... H01R 43/00; H01R 4/00
(52) U.S. Cl. .......................... 29/869; 174/93; 174/74 R
(58) Field of Search .............................. 29/869, 402.09, 29/402.11; 174/74 R, 75 R, 73.1, 87, 93

(56) References Cited

U.S. PATENT DOCUMENTS

| | | | | |
|---|---|---|---|---|
| 2,967,795 A | * | 1/1961 | Bollimeier et al. ........... | 174/93 |
| 3,175,032 A | * | 3/1965 | Strauss ........................ | 174/93 |
| 3,614,295 A | * | 10/1971 | Gillemot ...................... | 174/87 |
| 3,710,003 A | * | 1/1973 | Channell .................. | 174/72 R |
| 3,848,074 A | * | 11/1974 | Channell ..................... | 174/87 |
| 3,868,475 A | * | 2/1975 | Allison ........................ | 174/87 |
| 4,098,449 A | * | 7/1978 | Noesen ....................... | 228/115 |
| 4,221,924 A | * | 9/1980 | Gabriel et al. ............. | 174/74 A |
| 4,466,843 A | * | 8/1984 | Shimirak ..................... | 174/76 |
| 4,647,719 A | * | 3/1987 | Campbell et al. ............. | 174/93 |
| 4,654,474 A | * | 3/1987 | Charlebois et al. ....... | 174/88 R |
| 4,737,600 A | * | 4/1988 | Mathis et al. ................ | 174/87 |

(List continued on next page.)

OTHER PUBLICATIONS

An Examination of Temperature Rise Inside Aerial Splice Closures, Emanuel A. Capadona and Dave LaPointe, *Outside Plant*, Jul. 1988.

*Primary Examiner*—S. Thomas Hughes
*Assistant Examiner*—Marc Jimenez
(74) *Attorney, Agent, or Firm*—Greenblum & Bernstein, P.L.C.

(57) ABSTRACT

A thermal shield and hermetic seal is provided to prevent deterioration of plastic insulation in a cable including a plurality of insulated conductors. The shield includes a sheet of aluminum material wrapped around exposed insulated conductors of the cable, a pressure wrap superposed over the sheet of aluminum material, the pressure wrap being wrapped over the sheet of material, and an enclosure housing the wrapped insulated conductors. The shield and seal thus provides thermal and hermetic protection that prevents heat exposure as well as infiltration of oxygen and ultraviolet radiation into the splice for preventing deterioration of plastic insulation in the conductors of the cable in the area of the splice. A method is also provided for protecting conductor access points and permitting re-access thereto. The method includes opening a conducting access point cover, removing the conductor access The method further includes performing any necessary splicing, servicing and maintenance, wrapping the insulated conductors with a first wrap, wrapping the first wrap with a pressure wrap after completion of the servicing, and closing the conductor access point cover. The first wrap includes an aluminum wrapping material, and the pressure wrap is wrapped over the first wrap using a half lap double wrap method. Additionally, the method may include sealing an end of the pressure wrap to secure the end of the pressure wrap in position, wherein the sealing is performed by wrapping a piece of self-adhesive tape around the pressure wrap, and twisting an outer end of said sealing tape to form a pigtail to permit ease of re-entry.

21 Claims, 9 Drawing Sheets

U.S. PATENT DOCUMENTS

| | | | |
|---|---|---|---|
| 4,880,962 A | * 11/1989 | Nolf et al. | 174/93 |
| 4,885,194 A | * 12/1989 | Tight et al. | 174/93 |
| 4,933,512 A | * 6/1990 | Nimiya et al. | 174/93 |
| 5,214,243 A | * 5/1993 | Johnson | 174/93 |
| 5,451,278 A | * 9/1995 | Nolf | 174/93 |
| 5,455,391 A | * 10/1995 | Demesmaeker et al. | 174/93 |
| 5,456,959 A | * 10/1995 | Dawes | 174/93 |
| 5,753,854 A | * 5/1998 | Richards et al. | 174/93 |
| 5,793,921 A | * 8/1998 | Wilkins et al. | 174/93 |
| 5,817,979 A | * 10/1998 | O'Neill | 174/93 |
| 6,160,222 A | * 12/2000 | Claverie | 174/93 |

* cited by examiner

THERMAL SHIELD AND HERMETIC SEAL FOR PREVENTING DETERIORATION OF PLASTIC INSULATION IN OPEN ACCESS CLOSURES AND METHOD THEREFOR

CROSS-REFERENCE TO RELATED APPLICATIONS

The present application claims the benefit of U.S. Provisional Application No. 60/141,015, filed Jun. 29, 1999, the subject matter of which is herein expressly incorporated by reference.

BACKGROUND OF THE INVENTION

1. Field of the Invention

The present invention relates to a thermal shield ad hermetic seal that prevents deterioration of plastic insulation for electrical cable, such as communication cables, and to a method of extending the life of polyurethane chloride insulated cable (PIC) through reduction of exposure to heat, oxygen and ultraviolet radiation at access points along the PIC cable.

2. Background Information

Most communication cable used across the country since the mid-1950's has been polyurethane insulated cable, commonly called PIC cable, which has polymer insulation. This PIC cable includes copper conductors insulated in polyurethane enclosed in metallic and plastic sheaths. It is known that when the cable is kept undisturbed in it's original protective sheath or jacket, the cable underneath remains like new. However, problems occur in open-access splice closures and terminals where entry occurs on a somewhat regular basis for servicing. Exposure to heat and oxygen can slowly break down many polymer materials. High heat coupled with the presence of oxygen causes the breakup of the polymer chain as antioxidants escape. In addition, ultraviolet penetration, or photo-oxidation, accelerates cracking of the polymer insulation. Thus, once the opened cable is exposed to heat, oxygen, and ultraviolet radiation, the insulation around the conductors begins to deteriorate. After years of exposure, the insulation will begin to crack and flake off causing disturbance in a communication line using the cable. This disturbance is exacerbated by the presence of humidity or moisture. Cracked insulation conductors have zero oxidative induction time. Furthermore, patching the cracked insulation in a piecemeal fashion only remedies the problem in the short term. Thus, a goal has been to provide a remedy for the long term.

It is known in the building industry that using material with aluminum foil on roof sheathing lowers residential attic temperatures by approximately 30° F. It is also known to use sunshades having aluminum lining in parked vehicles to lower the inside temperature of the vehicle.

It is further known that wrapping aluminum foil around the splice bundle in black closures seems to reduce the temperature by 20° F. or more compared to those that do not have the aluminum foil. See Capadona and LaPointe, "An Examination Of Temperature Rise Inside Aerial Splice Closures", Outside Plant, Jul. 1988, pg. 22.

However, even with the reduction of temperature, exposure to oxygen remains a problem for the PIC cable. The present process is directed to the solution of the above-mentioned problems by providing a hermetic sealing process coupled with the use of an aluminum radiant shielding material that not only reduces the temperature, but also precludes the insulated wire from exposure to oxygen, thereby extending the life of the PIC cable.

BRIEF DESCRIPTION OF THE DRAWINGS

The above and the other objects, features and advantages of the present invention will be made apparent from the following description of the preferred embodiments, given non-limiting examples, with reference to the accompanying drawings, in whitch FIG. 1 perspective view of two power poles having a telephone cable which includes an aeral closure mounted thereon.

DETAILED DESCRIPTION OF THE PREFERRED EMBODIMENTS

Figure 1:
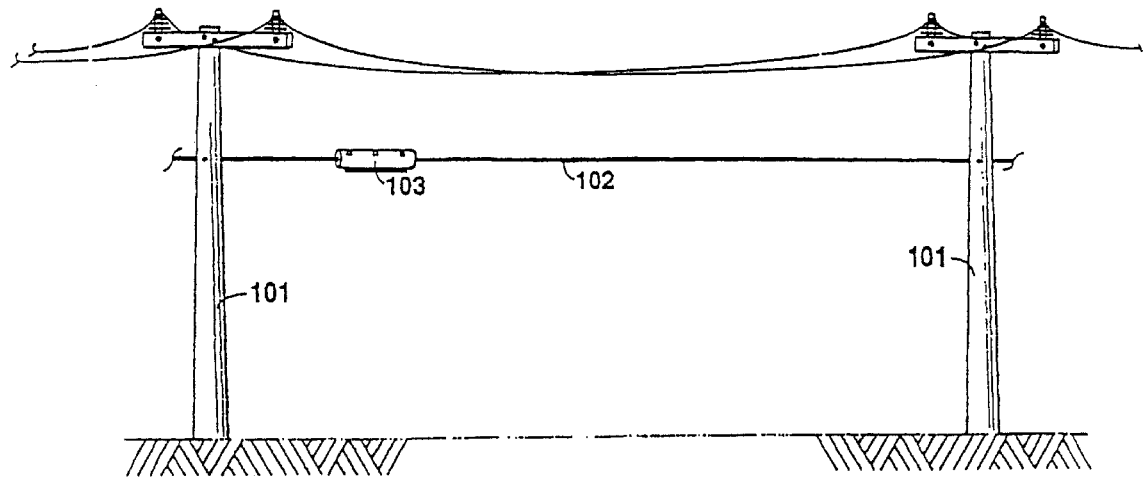

The present invention is directed to a method of wrapping PIC cable in order to reduce exposure to heat, oxygen, and ultraviolet radiation and thus to prevent deterioration of the plastic insulation in an open access splice closure. The present invention can be used on aerial cable with a double jacketed cable configuration, such as H lashed cable or P self-supporting cable. The present invention can also be used in all above ground buried closures with all non-pressurized PIC cable sheath configurations, such as a C.P.L. 6 buried closure. Additionally, the process of the present invention can be utilized, for example, on an XAGA 550 Closure, the SLIC Closure, and the TERMEX Terminal. However, the process of the present invention cannot be utilized on a single sheath aerial cable without force encapsulating the wirework, and also should not be used on cable with cracked PIC or other obvious insulation damage.

Accordingly, a primary object of the present invention is to provide a method for reducing heat, oxygen, and ultraviolet radiation exposure at access points along a PIC cable. Another object of the present invention is to provide a method for reducing heat, oxygen, and ultraviolet radiation exposure to access points along a PIC cable which is economically feasible.

A further object of the present invention is to provide a method for reducing heat, oxygen and ultraviolet radiation exposure to access points along a PIC cable by restoring the key components of the cable jacket previously removed, which would closely resemble the original makeup of the PIC cable.

Yet another object of the present invention is to provide a method for reducing the heat, oxygen, and ultraviolet radiation exposure to access points along a PIC cable, with a method that would utilize material already stocked and used by the telephone company.

Another aspect of the present invention is to provide a method for reducing the heat, oxygen and ultraviolet radiation exposure to access points along a PIC cable that permits easy entry and re-entry into the open access splice closures and terminals.

In another aspect of the present invention, a method is provided for reducing the heat, oxygen and ultraviolet radiation exposure to access points along a PIC cable, with a method that has relatively simple steps for a technician to follow during entry and re-entry to the open access splice closures and terminals. Additionally, some of the components utilized in the method are reusable which thus reduces the cost of re-entry.

A further aspect of the present invention is to provide a thermal shield and hermetic seal for an access point along a PIC cable, the shield and seal providing each of the advantages set forth above with respect to the method for reducing heat, oxygen, and ultraviolet radiation exposure at the access point.

In another aspect of the present invention, a method for protecting conductor access points and permitting re-access thereto is provided that includes opening a conducting access point cover, removing the conductor access point cover, exposing insulated conductors to allow access thereto, performing any necessary servicing and maintenance, wrapping the insulated conductors with a first wrap, wrapping the first wrap with a pressure wrap after completion of the servicing, and closing the conductor access point cover.

In other aspects of the present invention, the first wrap may include an aluminum wrapping material. Furthermore, the method may further include rolling the first wrap to form a tube, then flattening the tube to crease opposing sides thereof, then performing the wrapping with the first wrap, and the pressure wrap may be wrapped over the first wrap using a half lap double wrap method.

The method may further include sealing an end of the pressure wrap to secure the end of the pressure wrap in position, and the sealing may be performed by wrapping a piece of self-adhesive tape around the pressure wrap. Moreover, the method may further include twisting an outer end of the sealing tape to form a pigtail to permit ease of re-entry.

In a further aspect of the present invention, a method for protecting a cable splice is provided that includes opening a cable splice cover, removing the cable splice cover, exposing insulated conductors to allow access thereto, performing any necessary servicing and maintenance to the conductors, wrapping the insulated conductors with a first wrap, wrapping the first wrap with a pressure wrap after completion of the servicing, and closing the cable splice cover.

In other aspects of the present invention, the first wrap may include an aluminum wrapping material, and the pressure wrap may be wrapped over the first wrap using a half lap double wrap method. Additionally, the method may further include sealing an end of the pressure wrap to secure the end of the pressure wrap in position, and the sealing may be performed by wrapping a piece of self-adhesive tape around the pressure wrap, and may also include twisting an outer end of the sealing tape to form a pigtail to permit ease of re-entry.

In other aspects of the present invention, the method may include rolling the first wrap to form a tube, then flattening the tube to crease opposing sides thereof, then performing the wrapping with the first wrap. Furthermore, the cable splice may be provided on ends of buried cables that extend into a cable splice enclosure, and may further include folding a portion of the first wrap that extends above the insulated conductors downwardly, then performing the wrapping with the pressure wrap. The pressure wrap may be wrapped over the first wrap after the folding using a half lap double wrap method, and the method may include sealing an end of the pressure wrap to secure the end of the pressure wrap in position. Also, the sealing may be performed by wrapping a piece of self-adhesive tape around the pressure wrap, and may further include twisting an outer end of the sealing tape to form a pigtail to permit ease of re-entry.

In another aspect of the present invention, a thermal shield and hermetic seal is provided for preventing deterioration of plastic insulation in a cable including a plurality of insulated conductors. The shield and seal include a sheet of material wrapped around exposed insulated conductors of the cable, and the sheet may be formed of aluminum. A pressure wrap is superposed over the sheet of material, with the pressure wrap being wrapped over the sheet of material, and an enclosure houses the wrapped insulated conductors. Thus, the thermal shield and hermetic seal provides thermal and hermetic protection that prevents heat exposure as well as infiltration of oxygen and ultraviolet radiation into the splice for preventing deterioration of plastic insulation in the conductors of the cable in the area of the splice.

In other aspects of the present invention, the sheet of material may include a reinforced metallic wrapping material. The sheet of material may also include a layer of white UVI film, an inner layer of aluminum foil, and an outer layer of woven high density polyethylene. Furthermore, the pressure wrap may be formed as a 3 mil PVC material, and the pressure wrap may be wrapped over the sheet using a half lap double wrap method.

In further aspects of the present invention, the thermal shield and hermetic seal may further include a sealing member that secures an end of the pressure wrap to secure the end of the pressure wrap in position. The sealing member may include a piece of self-adhesive tape wrapped around the pressure wrap, and an outer end of the sealing tape may be twisted to form a pigtail to permit ease of re-entry into the splice shield. Additionally, the exposed conductors may be housed in an aerial enclosure suspended above ground, or the exposed conductors may be housed in an above ground pedestal enclosure for accessible portions of buried cables.

According to other aspects of the present invention, the shield and seal and the method for reducing the heat, oxygen and ultraviolet radiation exposure of access points along a PIC cable are provided to extend the life of the PIC cable, to reduce and/or eliminate cracked insulation, to reduce the number of telephone customer trouble reports, and to provide better, more reliable service to telephone customers.

Turning to FIG. 1 of the drawings, a pair of telephone poles 101 are shown which support a telephone cable 102, or other communications cable, therebetween. The telephone cable 102 includes an aerial closure 103, which is a type of conductor access point cover that is shown in greater detail in FIG. 2. While specific reference is made to an aerial closure in the description of the present invention, no specific limitation is made to an aerial closure alone, but any type of conductor access point cover or enclosure would be sufficient to practice the present invention.

Figure 2:
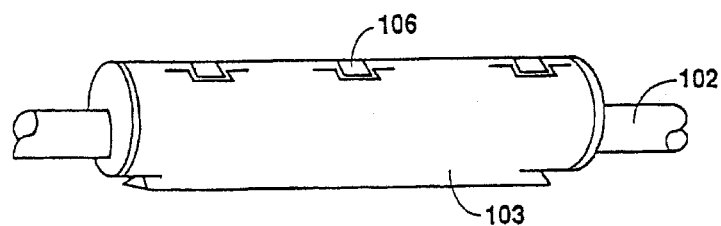
FIG. 2 is a respective view of the closed aerial closure of FIG. 1.
Figure 3:
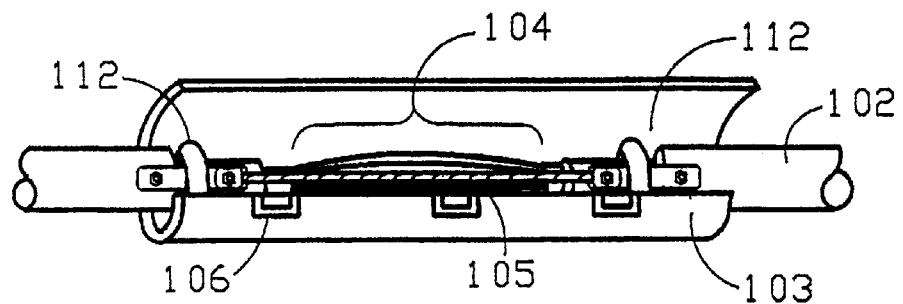
FIG. 3 is a perspective view of the aerial closure of FIG. 1 after opening the closure to expose a conductor access point and insulated wires.

The closed aerial closure 103 depicted in FIG. 2 includes aerial closure clamps 106, and the aerial closure 103 houses splices for the telephone cable 102. A technician begins his or her work by opening the aerial closure 103 to gain access to the insulated wires therein, as seen in FIG. 3.

Figure 4:
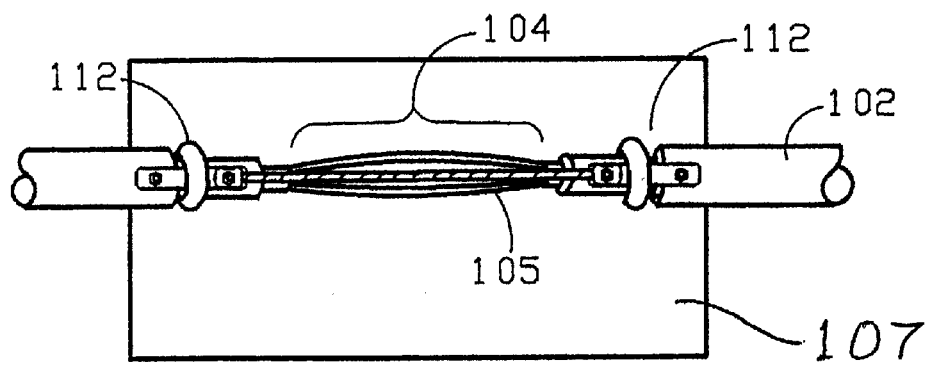
FIG. 4 is a perspective view of the conductor access point and insulated wires with the aerial closure removed, and showing a sheet of aluminum wrap in the background.

Once the aerial closure clamps 106 have been released, the conductor access point 104 and insulated wires 105 are exposed. The aerial closure 103 may be removed by the technician, as shown in FIG. 4, in order to perform the necessary splices, repairs or maintenance on the insulated wires 105. Splices to the telephone cable 102 are thus shown in FIG. 3.

After the insulated wires have been serviced by the technician, the conductor access point 104 and insulated wires 105, with the aerial closure removed as shown in FIG. 4 are now ready for the process of the present invention. First, the technician measures and cuts a sheet of aluminum wrap 107 (FIG. 4) to have a length sufficient to extend about one-half inch past each of the drip collars 112 on either side of the insulated wires 105, and a width sufficient to wrap twice around the largest diameter of the insulated wires 105. The aluminum wrap 107 may be formed from any suitable metallic sheet material, such as aluminum, and preferably may be formed of a laminated material including a layer of white UVI (ultraviolet inhibitor) film, an inner layer of metal foil, such as aluminum, and an outer layer of woven high density polyethylene. Such a material has high strength and high tear resistance, is commercially available under the name "Protective Cable Wrap" from Cadillac Products, Inc., Paris, Ill. Alternatively, the aluminum wrap 107 may include a layer of polyethylene having an aluminum reinforced inner core covered by a thin, clear layer of polyethylene.

Figure 5:
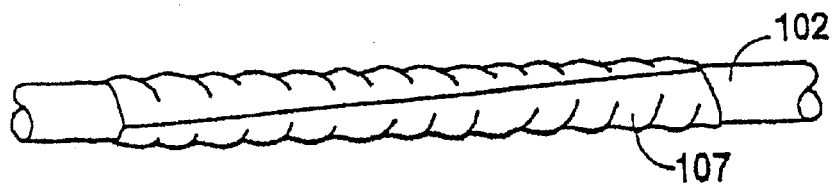
FIG. 5 is a perspective view of an aluminum wrapped conductor access point.

Once the sheet of aluminum wrap 107 has been cut to size, the sheet is rolled in the width direction to form a relatively small diameter tube, after which the technician places the tube of aluminum wrap between their thumb and forefinger and runs the thumb and forefinger along the tube to flatten the tube and form opposed creased edges. The creased edges of the flattened tube aid in forming the aluminum wrap 107 around the conductor access point. Next, the sheet of aluminum wrap 107 is snugly wrapped around the insulated wires 105 of the telephone cable as well as over the drip collars 112. A piece of self-adhesive tape, for example, 1" vinyl tape, may be used at one end of the aluminum wrap 107 to secure the wrap to the wire 102 adjacent the drip collar 112 to hold the wrap 107 in position. FIG. 5 depicts the conductor access point of the telephone cable 102 upon completion of the wrapping with the aluminum wrap 107.

Figure 6:
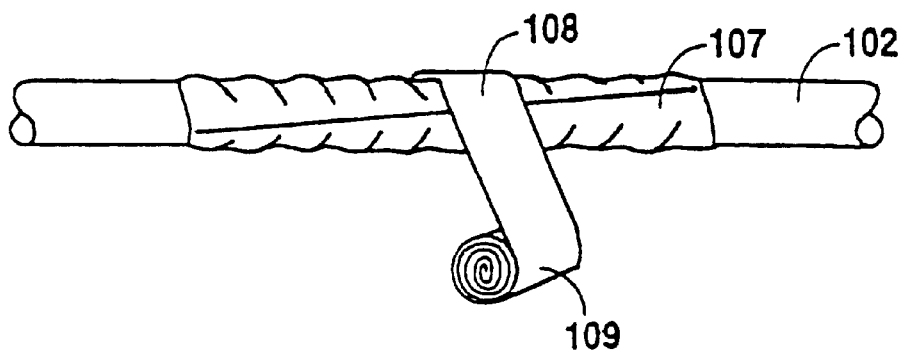
FIG. 6 is a perspective view of the aluminum wrapped conductor access point being wrapped with pressure wrap.

The next operation to be performed in the method of the present invention is depicted in FIG. 6 of the drawings. Once the conductor access point of the telephone cable 102 has been wrapped with the aluminum wrap 107, a pressure wrap 108 from a pressure wrap roll 109 is tightly wrapped over the aluminum wrap 107 using a half lap double wrap method as shown in FIG. 6. In the half lap double wrap method, wrapping with the pressure wrap 108 begins at the center of the wrapped conductor access point, and the aluminum wrap 107 is wrapped with the pressure wrap 108 from the center to one end including the drip collars 112, then from the one end to the other end including the drip collar, and then back to the center of the conductor access point where the wrapping was initiated. During the wrapping with the pressure wrap 108, sufficient wrapping force should be applied to force the air containing oxygen from the wrapped conductor access point and to maintain the exclusion of air, and consequently oxygen, from the wrapped conductor access point. The pressure wrap 108 may be formed from any suitable pressure wrap material, for example, a three mil PVC pressure wrap (which is commercially available from sources such as the Penco Company, Cypress, Tex. and the 3M Company, Minneapolis, Minn.)has been found suitable to force air out from the conductor access point to thereby form a hermetic seal over the aluminum wrapped wires.

Figure 7:
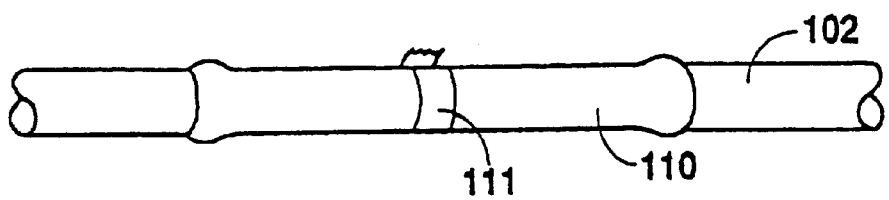
FIG. 7 is a perspective view of the aluminum and pressure wrapped conductor access point provided with a strip of vinyl tape.
Figure 8:
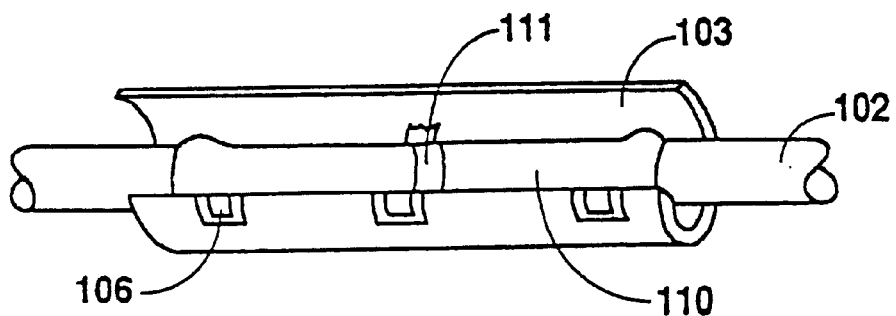
FIG. 8 is a perspective view of the aluminum and pressure wrapped wires with a strip of vinyl tape at the conductor access point prior to closure of the aerial closure.
Figure 9:
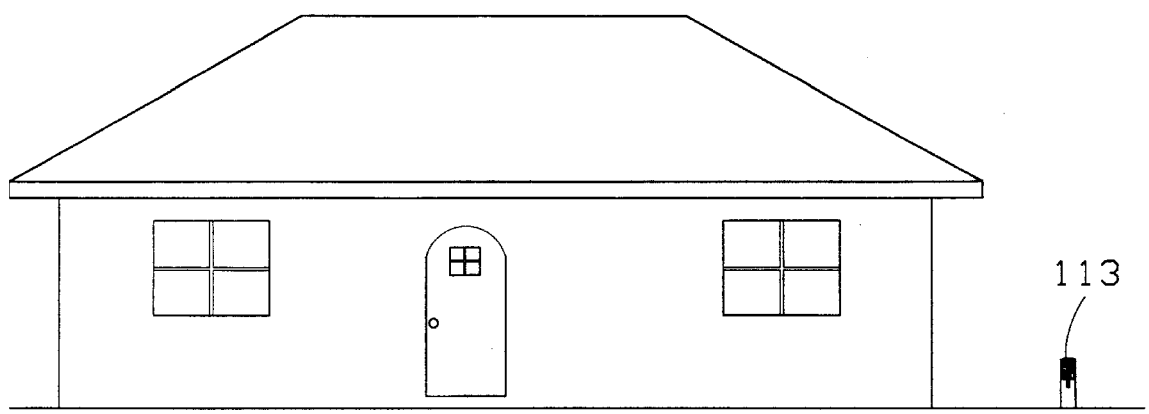
FIG. 9 depicts a C.P.L. 6 enclosure that houses splices for buried cable located adjacent a building.

The completed pressure wrapping is shown in FIG. 7 and has been designated with the reference numeral 110. Upon completion of the wrapping, the end (not shown) of the pressure wrap 108 may be held by a strip of any suitable tape, for example, a 1-inch vinyl adhesive tape 111 as shown in FIG. 7. The vinyl tape 111 is wrapped around the center of the pressure-aluminum wrapped wires 110 primarily to secure the end of the pressure wrap in position. After the vinyl tape 111 is wrapped around the center of the pressure-aluminum wrapped wires 110, the tape is twisted into a pigtail to allow for easy removal in the event re-entry is necessary.

Once the pressure-aluminum wrapped wires 110 have been secured by the vinyl tape 111 at the conductor access point, the technician will then re-enclose the pressure-aluminum wrapped wires 110 within the aerial closure 103 and secure the aerial closure clamps 106. In the event re-entry becomes necessary, the technician need only retrace the previous steps to gain access for servicing or maintenance. That is, the 1-inch vinyl tape is removed, followed by removal of the pressure wrap and the aluminum wrap, respectively.

According to another aspect of the invention, drip collars 112, which are typically built up on the telephone cable 102, are used to prevent water from entering the cable opening. These drip collars 112 must be built between the inner and outer cable jackets to prevent water, that may enter the outer jacket if the jacket is damaged, from migrating along the inner jacket into the conductor access point as shown in FIG. 3. As seen in FIGS. 3–7, the aluminum wrap 107 and the pressure wrap 108 are both provided to extend beyond the drip collars 112, preferable by at least ¼ to ½ inch.

Figure 10:
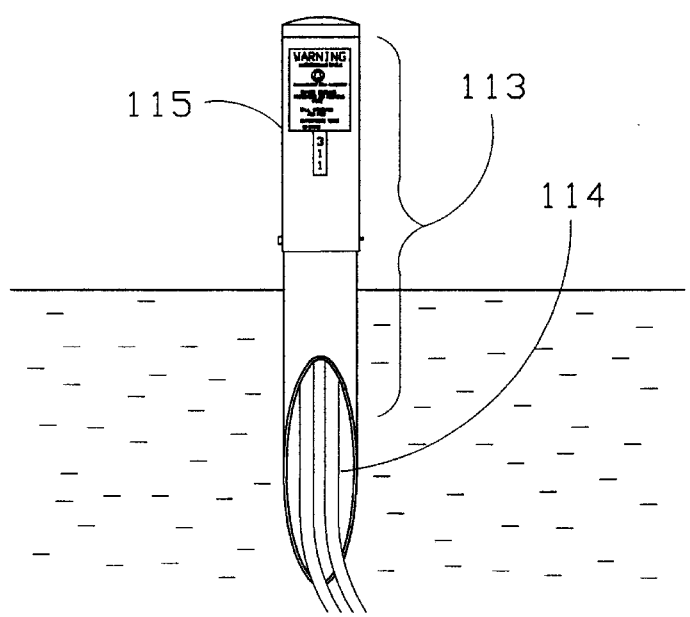
FIG. 10 is a perspective view of the C.P.L. 6 enclosure of FIG. 9.
Figure 11:
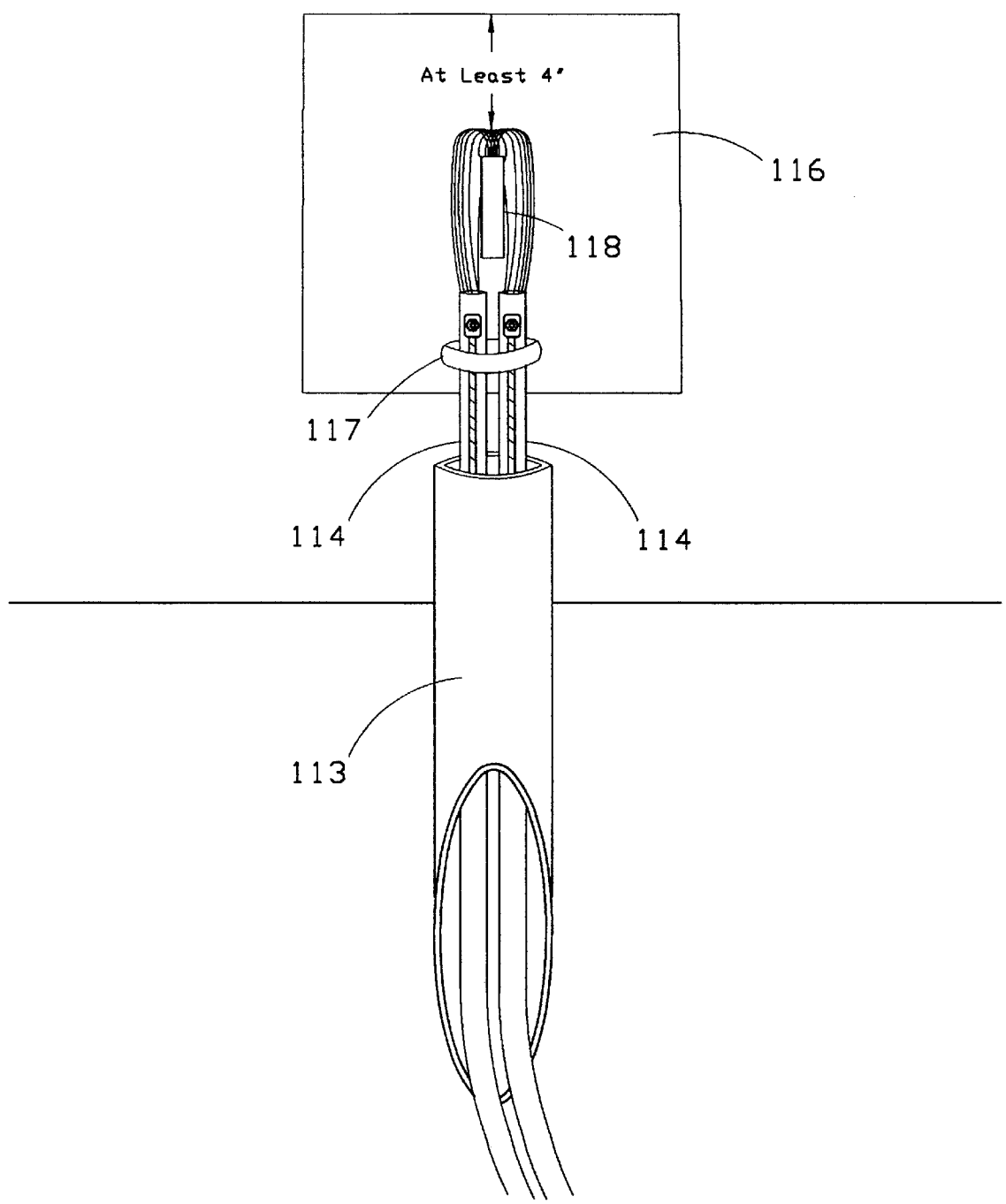
FIG. 11 is a perspective view of the conductor access point and insulated wires with the upper portion of the C.P.L. 6 enclosure of FIG. 10 removed, and showing a sheet of aluminum wrap in the background.
Figure 12:
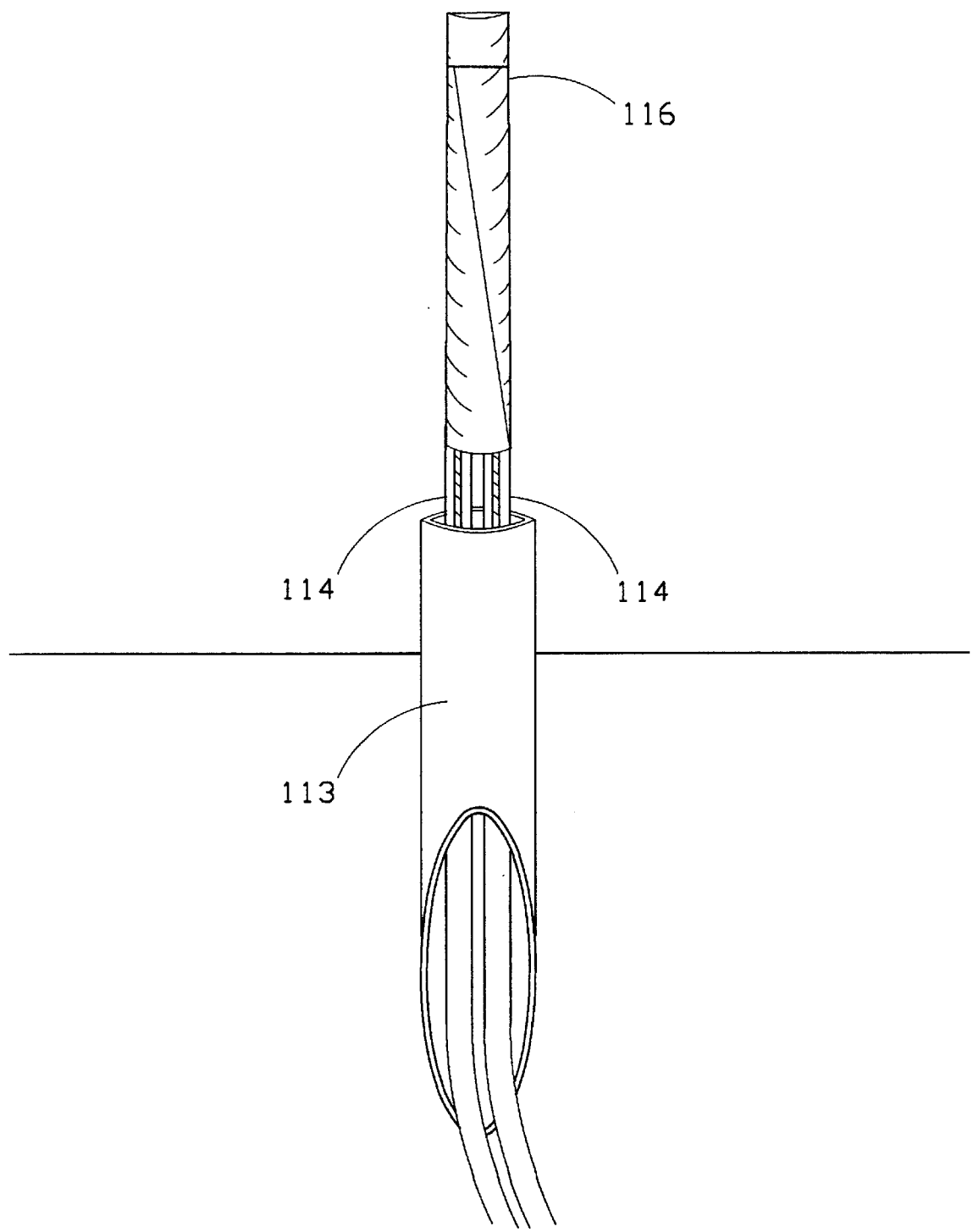
FIG. 12 is a perspective view of an aluminum wrapped conductor access point for the C.P.L. 6 enclosure of FIG. 10.
Figure 13:
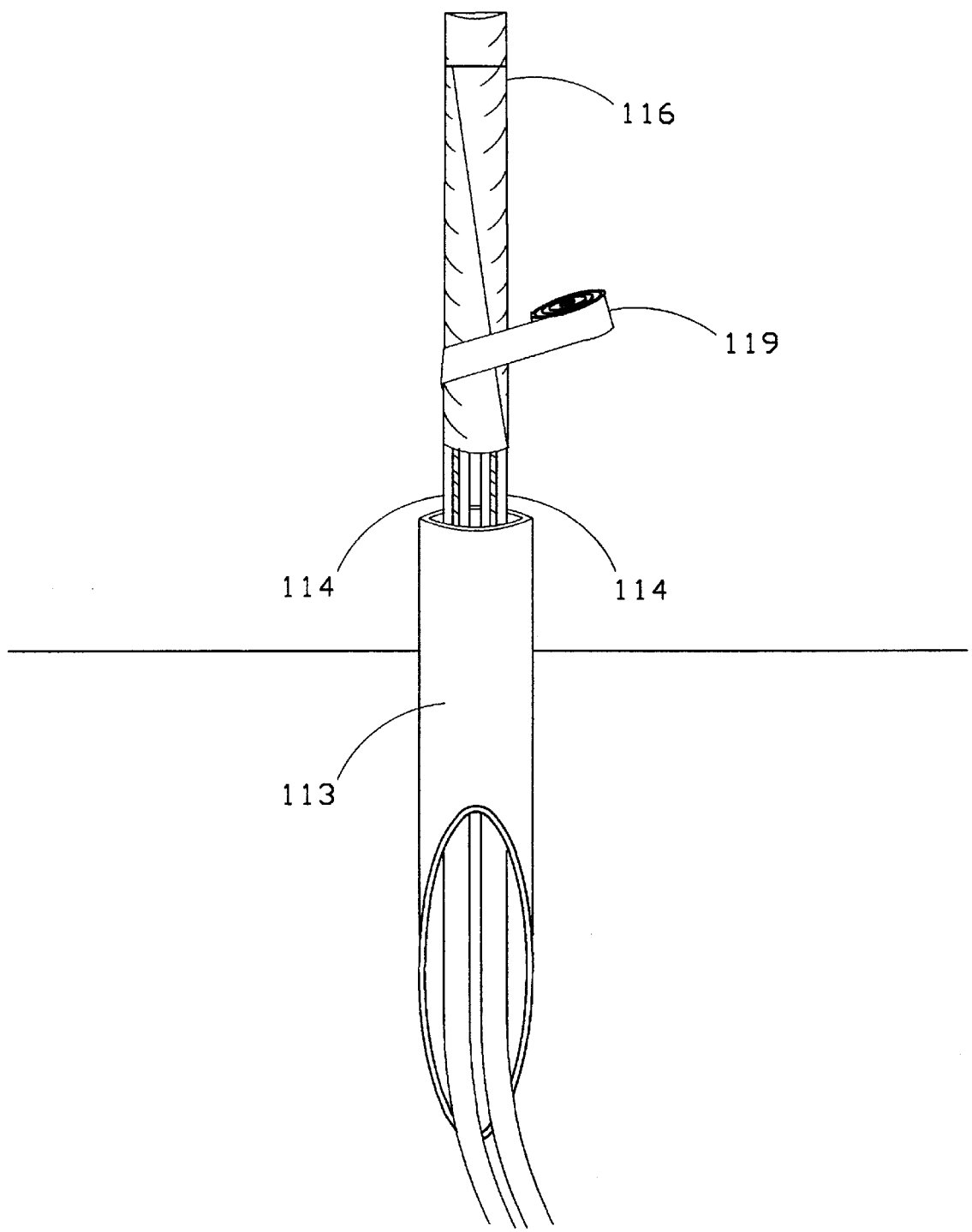
FIG. 13 is a perspective view of the aluminum wrapped conductor access point for the C.P.L. 6 enclosure being wrapped with pressure wrap.
Figure 14:
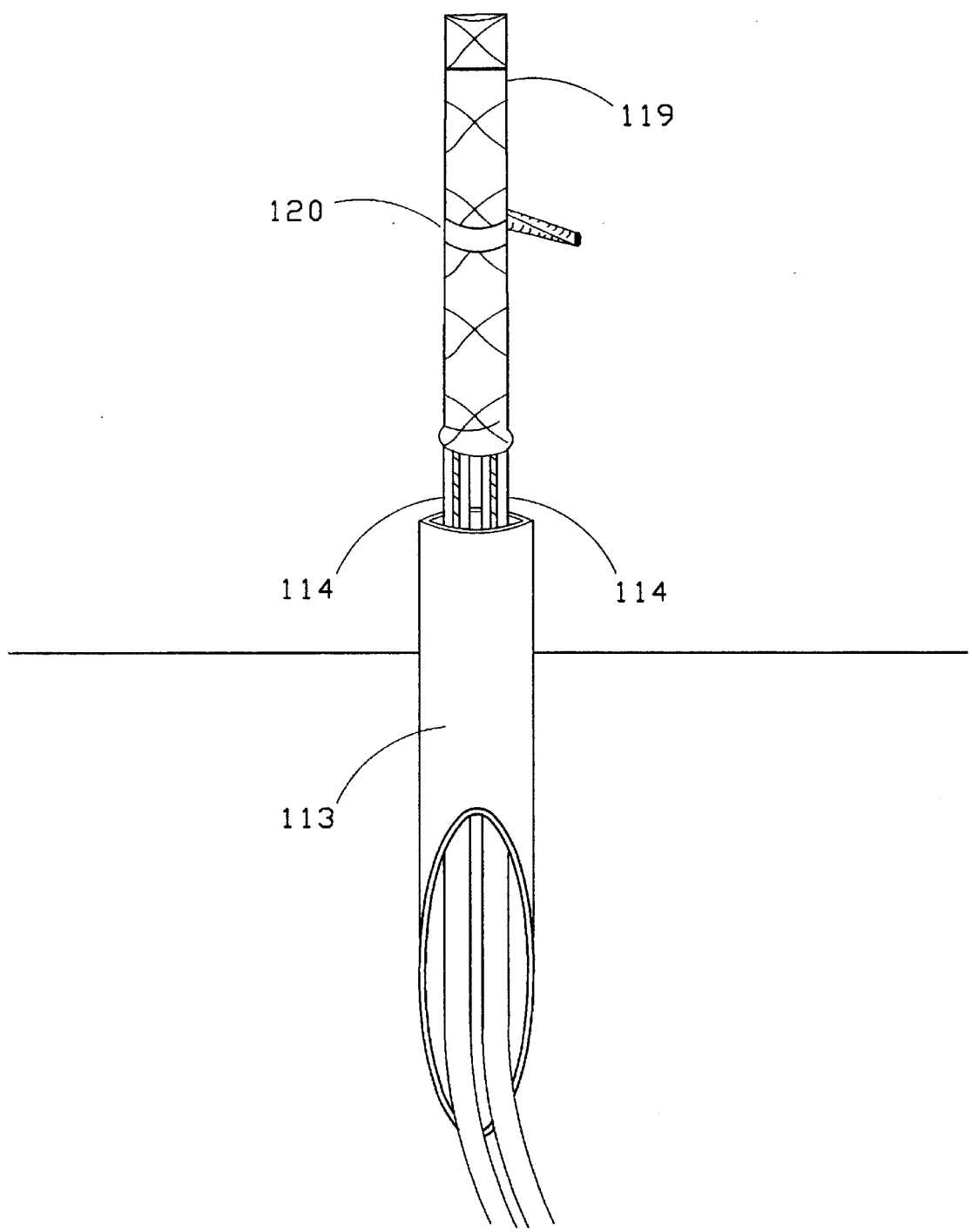
FIG. 14 is a perspective view of the aluminum and pressure wrapped conductor access point for the C.P.L. 6 enclosure provided with a strip of vinyl tape.
Figure 15:
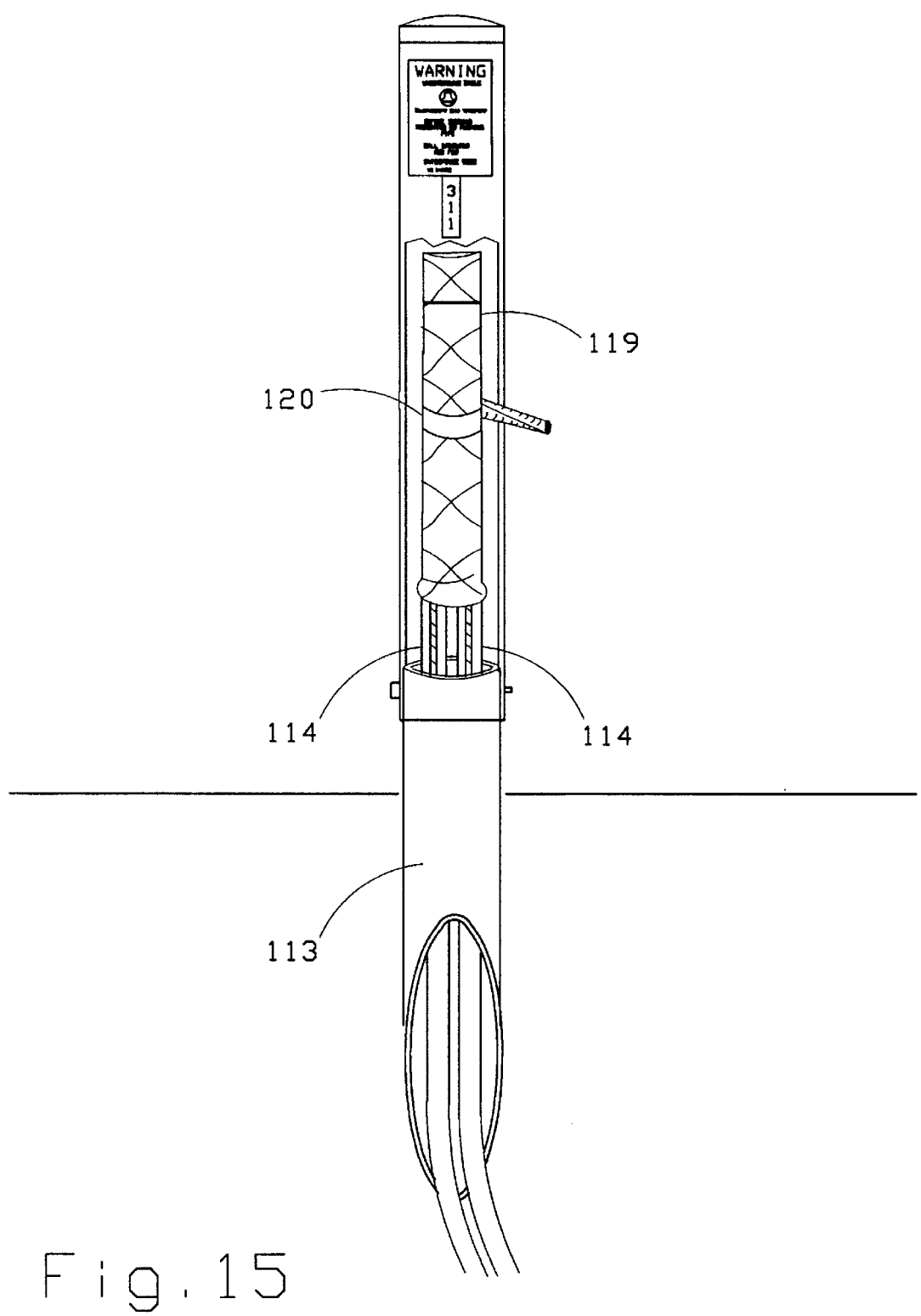
FIG. 15 is perspective view of a closed C.P.L. 6 enclosure with a portion broken away to show the aluminum and pressure wrapped wires with a strip of vinyl tape at the conductor access point.

A second embodiment of the present invention relates to a buried closure, such as a C.P.L. 6 splice closure 113 (as shown in FIGS. 9–15), where the cable 114 is located within the ground but the closure remains above the ground (FIG. 10). After the conductor access point cover 115 is removed, the technician will measure and cut a sheet of aluminum wrap 116 to have a length that extends approximately 1-inch below a sealing collar 117 on the cables to be wrapped and to extend upwardly approximately four inches above the splice 118 (as shown in FIG. 11). The sheet should have a width sufficient to wrap twice around the largest diameter of the splice. As in the first embodiment, the aluminum wrap 116 is rolled in the width direction of the sheet to form a small diameter tube which is then creased between the thumb and forefinger of the technician. The aluminum wrap 116 is then snugly wrapped around the splice 118 (FIG. 12) in the same manner as the first embodiment. The aluminum wrap may be secured at the end adjacent the sealing collar by taping if desired. Subsequently, the pressure wrap 119 is then tightly wrapped around the splice (FIG. 13) using the half lap double wrap method wherein the pressure wrap is wrapped from the sealing collar to the top of the splice, after which the four inch overlap is folded down, and the pressure wrap is crisscrossed to seal the end of the splice, then wrapped back down to the sealing collar. A piece of tape 120, for example, a 1-inch vinyl adhesive tape, is placed around the sealing collar to hold the wrap in place and is twisted to form a pigtail to allow ease of re-entry (FIG. 14). FIG. 15 depicts a closed C.P.L. 6 enclosure with a portion broken away to show the aluminum and pressure wrapped wires with a strip of vinyl tape at the conductor access point. The above process is merely reversed to gain re-entry.

Although the invention has been described with reference to several exemplary embodiments, it is understood that the words that have been used are words of description and illustration, rather than words of limitation. The method and shield and seal disclosed can be used to protect electric cables, including but not limited to communication cables, such as telephone cables and data transmission cables.

Changes may be made, without departing from the scope and spirit of the invention in its aspects. Although the invention has been described herein with reference to particular hardware, means, and embodiments, the invention is not intended to be limited to the particulars disclosed herein; rather, the invention extends to all functionally equivalent structures, methods and uses, such as are within the scope of the appended claims.

What is claimed is:

1. A method for protecting conductor access points and permitting re-access thereto, comprising:
   opening a conductor access point cover;
   removing said conductor access point cover;
   exposing insulated conductors to allow access thereto;
   performing any necessary servicing and maintenance;
   wrapping the insulated conductors with a first wrap that snugly engages the insulated conductors;
   then wrapping said first wrap with a pressure wrap, so that air containing oxygen is forced from, and maintained excluded from, the wrapped conductors, after completion of said servicing; and
   closing said conductor access point cover.

2. The method according to claim 1, wherein said first wrap comprises an aluminum wrapping material.

3. The method according to claim 2, further comprising rolling said first wrap to form a tube, then flattening said tube to crease opposing sides thereof, then performing said wrapping with said first wrap.

4. The method according to claim 2, wherein said pressure wrap is wrapped over said first wrap using a half lap double wrap method.

5. The method according to claim 4, further comprising sealing an end of said pressure wrap to secure the end of said pressure wrap in position.

6. The method according to claim 5, wherein said sealing is performed by wrapping a piece of self-adhesive tape around said pressure wrap.

7. The method according to claim 6, further comprising twisting an outer end of said sealing tape to form a pigtail to permit ease of re-entry.

8. A method for protecting a cable splice, comprising:
   opening a cable splice cover;
   removing said cable splice cover;
   exposing insulated conductors to allow access thereto;
   performing any necessary servicing and maintenance to said conductors;
   wrapping the insulated conductors with a first wrap that snugly engages the insulated conductors;
   then wrapping said first wrap with a pressure wrap, so that air containing oxygen is forced from, and maintained excluded from, the wrapped conductors, after completion of said servicing; and
   closing said cable splice cover.

9. The method according to claim 8, wherein said first wrap comprises an aluminum wrapping material.

10. The method according to claim 9, wherein said pressure wrap is wrapped over said first wrap using a half lap double wrap method.

11. The method according to claim 10, further comprising sealing an end of said pressure wrap to secure the end of said pressure wrap in position.

12. The method according to claim 11, wherein said sealing is performed by wrapping a piece of self-adhesive tape around said pressure wrap.

13. The method according to claim 12, further comprising twisting an outer end of said sealing tape to form a pigtail to permit ease of re-entry.

14. The method according to claim 9, further comprising rolling said first wrap to form a tube, then flattening said tube to crease opposing sides thereof, then performing said wrapping with said first wrap.

15. The method according to claim 14, wherein the cable splice is provided on buried cables that extend into an above ground buried cable enclosure, and further comprising folding a portion of said first wrap that extends above said insulated conductors downwardly, then performing said wrapping with said pressure wrap.

16. The method according to claim 15, wherein said pressure wrap is wrapped over said first wrap after said folding using a half lap double wrap method.

17. The method according to claim 16, further comprising sealing an end of said pressure wrap to secure the end of said pressure wrap in position.

18. The method according to claim 17, wherein said sealing is performed by wrapping a piece of self-adhesive tape around said pressure wrap.

19. The method according to claim 18, further comprising twisting an outer end of said sealing tape to form a pigtail to permit ease of re-entry.

20. A method for protecting conductor access points and permitting re-access thereto, comprising:
   opening a conductor access point cover;
   removing said conductor access point cover;
   exposing insulated conductors to allow access thereto;
   performing any necessary servicing and maintenance;
   wrapping the insulated conductors with a first wrap that snugly engages the insulated conductors;
   then wrapping said first wrap with a strip of pressure wrap material after completion of said servicing; and
   closing said conductor access point cover.

21. The method for protecting conductor access points and permitting re-access thereto according to claim 20, wherein said strip of pressure wrap material is a strip of PVC material.

* * * * *

UNITED STATES PATENT AND TRADEMARK OFFICE
CERTIFICATE OF CORRECTION

PATENT NO.   : 6,378,202 B1
DATED        : April 30, 2002
INVENTOR(S)  : W. Eisele It is certified that error appears in the above-identified patent and that said Letters Patent is hereby corrected as shown below:

<u>Title page,</u>
Item [57], ABSTRACT,
Line 17, after "access" insert -- point cover if necessary, and exposing insulated conductors to allow access thereto. --

Signed and Sealed this

Twenty-eighth Day of January, 2003

JAMES E. ROGAN
*Director of the United States Patent and Trademark Office*